United States Patent [19]

Lippman et al.

[11] Patent Number: 4,673,981
[45] Date of Patent: Jun. 16, 1987

[54] UNRECORDABLE VIDEO SIGNALS

[75] Inventors: Andrew B. Lippman, Salem; Victor M. Bove, Jr., Cambridge; Jerome B. Wiesner, Watertown, all of Mass.

[73] Assignee: Massachusetts Institute of Technology, Cambridge, Mass.

[21] Appl. No.: 592,290

[22] Filed: Mar. 23, 1984

[51] Int. Cl.[4] ............................................. H04N 5/14
[52] U.S. Cl. ..................................... 358/160; 358/141
[58] Field of Search ................ 358/160, 141, 140, 119

[56] References Cited

U.S. PATENT DOCUMENTS

4,488,176 12/1984 Bond et al. ......................... 358/141

Primary Examiner—James J. Groody
Assistant Examiner—Michael D. Parker
Attorney, Agent, or Firm—Robert F. O'Connell

[57] ABSTRACT

A technique for handling video signals so as to permit such signals to be satisfactorily displayed on video display devices, such as TV receivers or monitors, but to prevent such signals from being satisfactorily recorded by video recording devices. In a particular embodiment thereof the video frame time base is altered in a selected manner, as by lengthening or shortening the time bases of successive video frames, or successive groups of video frames. The alterations thereof can be in discrete steps and be performed cyclically so that during each overall cyclical time period the cumulative error is zero.

21 Claims, 11 Drawing Figures

UNRECORDABLE VIDEO SIGNALS

INTRODUCTION

This invention relates generally to the handling of video signals and more particularly to techniques for processing video signals so that they can be satisfactorily displayed on video display devices but cannot be satisfactorily recorded by video recording devices.

BACKGROUND OF THE INVENTION

Television broadcasting stations provide video programming which can be transmitted as video signals by using general omni-directional antennae means for cost-free reception and display by home consumer television sets or commercial television outlets, for example, or by using suitable cable communication channels for reception by a more limited number of viewers who normally must pay a fee for the use of such cable broadcast and reception facilities.

When such video signals are transmitted and received for display on a conventional video display device, the video signals are then readily available and at no further cost can be simultaneously recorded on suitable video tape recorders, e.g., conventional video cassette recorders, for subsequent replay. The ability of viewers to record video programming, particularly, for example, motion pictures transmitted as video signals, tends to render any subsequent transmittal of such video programs or the sale of commercial video tapes thereof significantly less profitable for the broadcasters or the commercial producers of tapes thereof.

Such a situation has been aggravated from the point of view of the originating sources of such video signals by recent court decisions which have appeared to establish the principle that the tape recording of freely transmitted video signals is legitimate and cannot be made to bear a royalty payment or otherwise be controlled either by video program creators, by video program broadcasters, or by commercial tape producers. The situation is further aggravated by the growing market for video home recorders which continues to increase the number of potential viewers who can record broadcast video programs for later replay.

Such situation reduces considerably the value of the broadcast programming material, i.e. its value for the retransmission or the commercial recording thereof, and tends to reduce the revenue which broadcasters, and ultimately creators of video programming, might obtain for such purposes, e.g. from broadcast sponsors, who recognize the reduction in the number of viewers of video program re-runs, or from potential purchasers of commercially prepared video tapes.

In order to improve such situation for broadcasters, creators, and commercial recorders of video programs or motion pictures, it is desirable to devise a technique which will permit a viewer to receive a broadcast video signal for satisfactory display and viewing on a suitable video screen, i.e., a conventional TV receiver or monitor, but will prevent such viewer from recording the received video signal on currently available video recording devices, or future improved recording devices.

It is further desirable that any such technique not require the insertion of specific codes into the video signal for disabling the recording devices, which codes might be similarly disabled, and hence defeat the purpose thereof, by the recording device owners or distributors. Nor is it desirable that such technique include any processes which would limit or degrade in any significant and recognizable way the accurate display for viewing of such video signal on a video display device.

Insofar as can be determined there appears to be no known technique or device available in the market at the present time for providing techniques for handling video signals in order to achieve such purpose.

BRIEF SUMMARY OF THE INVENTION

In accordance with the invention a technique is devised for responding to an input video signal conforming to a selected standard (e.g., to an NTSC, PAL, or SECAM standard, for example) and for processing such signal in a way which generates an output video signal effectively conforming to the same selected standard but having a selected characteristic which has been suitably altered in such a manner that the alterations are within the range of response tolerance of video display devices, such as a TV receivers or monitors, but are outside the range of response tolerance of video recording devices. Preferably such technique, in accordance with one embodiment of the invention, alters the video frame time base, i.e., the time for presenting one frame of video information, by either lengthening such frame time base or shortening such frame time base, or both. One specific approach to producing such variations in the frame time base of a standard video signal, for example, is to add one or more lines to each frame or to subtract one or more lines from each frame. In one preferred embodiment, for example, the addition and subtraction of lines can be performed in successive frames, or groups of frames, progressively in selected, discrete steps, in a generally cyclical manner so that, throughout the overall processing of a video program, no frames of the video signal are lost and the synchronization between the altered video signal and the accompanying sound, or audio, signal remains within tolerable limits for viewing and listening.

It is found that, when the time base for a frame is lengthened by adding a sufficient number of lines or shortened by deleting a sufficient number of lines, video recording devices are unable to respond to such timing variations and hence are unable to store the video signal in a sufficiently accurate manner so as to provide a satisfactory recorded signal for subsequent play back and viewing. Such inability to respond satisfactorily is essentially due both to the electromechanical nature of video recorders and to the recording format used therefor. In contrast, video display devices can still respond to the altered signal so as to produce a satisfactory viewing image.

DESCRIPTION OF THE INVENTION

The invention can be described in more detail with the help of the accompanying drawings wherein:

FIG. 9 shows a block diagram depicting the invention as used with a transmitter for transmitting video signals to remote video receivers.

Figure 1:
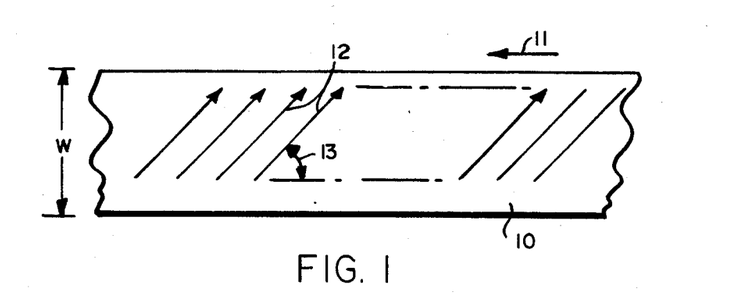
FIG. 1 shows in diagrammatic form the manner in which video signals are stored in a conventional video recording device.

It is helpful in understanding the invention to review the manner in which video signals are recorded in a typical video recording device, e.g. any one of many video cassette recorders which are currently available on the market. Such recording devices respond to NTSC standard (or other standard) video signals and utilize relatively wide tapes for storing the video information therein. As can be seen in FIG. 1, for example, a tape 10 having a width W (where W may be 8 mm, ½ or ¾ inch) is caused to move in a continuous linear direction, as shown by arrow 11, while a pair of recording heads are caused to move in a plurality of adjacent discrete paths each having a direction which is at a selected angle 13 with respect to the direction of the tape movement, as shown by arrows 12. The speed of motion of the tape and those of the recording heads are coordinated so that video information corresponding to one complete field (a frame comprises two interlaced fields), or a group of lines fewer than a field is recorded on tape 10 as the heads move from the lower to the upper positions shown by arrows 12 in a manner well known to those in the art.

The coordinated movements of the tape and the heads must be specifically set so that the device can accurately respond mechanically so as to be suitably synchronized with the incoming video signal, as is well known in the art, so that each frame of the video signal is accurately recorded for suitable reproduction when it is read out at a later time.

In accordance with a particular embodiment of the invention, it has been determined that a video display device exhibits a relatively high tolerance to video signal frame time base errors and can satisfactorily display a video signal so long as the signal frame time base error is maintained within a selected range In fact this tolerance is advantageous and allows the receiver to display substandard signals as might result from a home recorded tape or a home computer.

On the other hand, because a video tape recorder utilizes electromechanical elements, its tolerance for frame time base errors is relatively low and such a recording device requires that time base errors be minimized as much as possible or at least held within much smaller limits. In particular it has been found that, while frame time base errors within a reasonable range for a video display device will not become sufficiently large to cause the displayed image to become unviewable, frame time base errors in a video recorder within the same range will be sufficiently large to cause the signal to become unrecordable. Such differences in response to time base errors can be traced to the fact that a video recorder relies upon precise and interrelated horizontal and vertical sweep timing, while a video display device does not, the latter operating most often with separate vertical and horizontal scanning circuitry, the vertical scan depending only upon the frame rate and the horizontal scan only on the line rate, such devices thereby operating with much greater acceptable time base deviations.

A NTSC standard video signal utilizes a frame rate of about 30 fps which corresponds to a scanning time for one frame of about 1/30th of a second (e.g. about 33.33 milliseconds). If the scanning time for a video frame is increased, e.g. to 36 milliseconds, or is decreased, e.g. to 30 milliseconds, it is found that video display devices will respond thereto and still provide a satisfactory image display of the frame for viewing purposes. On the other hand, a video tape recorder will not be able to respond to such changes and still provide a satisfactory recording of the signal for subsequent playback and viewing.

In accordance with the invention, a system is provided for receiving a video signal, which conforms to a recognized video standard, e.g., an NTSC standard, and for providing a video output signal which effectively corresponds to the same video standard, a selected characteristic of the video output signal having been altered, preferably in a specific embodiment thereof wherein the video frames of the video output signal have altered frame time bases. As discussed above, the video output signal can be transmitted, for example, for reception and display at remote video signal receiver means, e.g., home consumer television sets or commercial television outlets, as shown in FIG. 9, wherein a video signal is provided to a processing system 15, which system produces a video output signal having altered frame time bases in accordance with the invention, the video output signal being in being supplied to a suitable transmitter means 35 for transmission to remote video signal receiver means. The time base alteration is arranged so that it is sufficiently great that a video recording device will not respond thereto in a manner which would provide a satisfactory recording of the video signal but at the same time not so great as to prevent a video display device from responding thereto to display an image which is satisfactory for viewing purposes.

A preferred technique in accordance with the invention for altering the frame time base of a video signal is to add lines to or subtract lines from each video frame thereof. Since the NTSC line standard is 525 lines per frame, in order to alter the frame time base, lines can either be added to a frame (e.g., to provide a frame having 527 lines, 529 lines, 531 lines, etc.) or lines can be deleted from a frame (e.g., to provide a frame having 523 lines, 521 lines, 519 lines, etc.).

It is desirable to arrange the time base alteration so as to both add and delete cyclically the same number of lines over a reasonable time period so that for the overall time period the cumulative error is zero. Such alteration is such that video and audio synchronization is not adversely affected from the viewpoint of the viewer/listener of a displayed video signal and continuity is provided from frame to frame (i.e., no frames need be repeated or no frames need be deleted). On the other hand, within each cyclical time period the video signal is sufficiently altered so as to prevent a video recording device from responding satisfactorily thereto.

Figure 2:
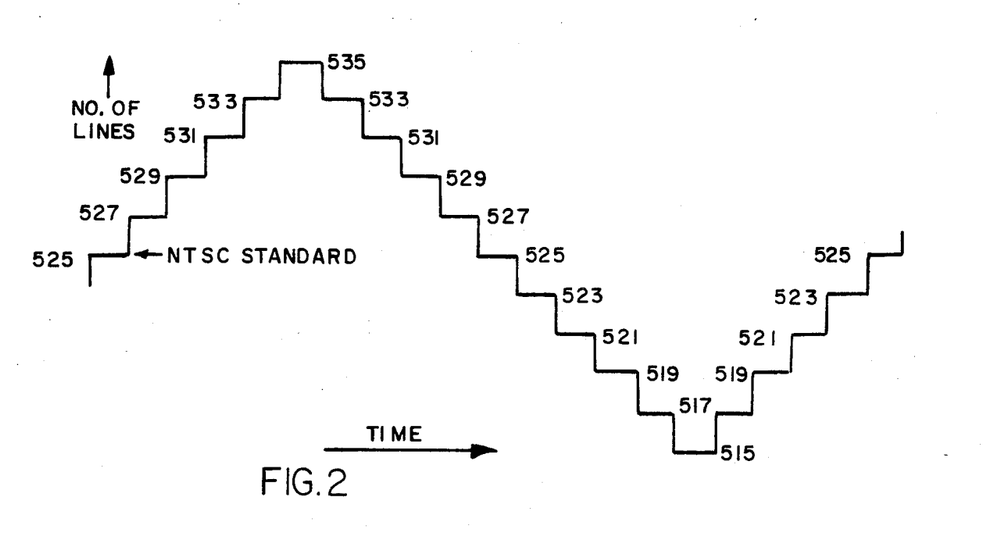
FIG. 2 shows a diagram helpful in explaining the techniques of the invention.

The graph of FIG. 2 diagrammatically depicts a particular example of the technique of the invention showing the number of lines in successive video frames, or groups of video frames, of an altered signal as a function of time. As seen therein, a standard video signal is altered by progressively increasing the number of lines in successive frames, or groups of frames, by a fixed amount in discrete steps (e.g. adding two blank lines, i.e., lines containing no active video information, at each subsequent frame or each subsequent group thereof) up to a selected maximum value (e.g. up to 535 lines) and then by progressively decreasing the number of lines in successive frames or groups thereof by the same fixed amount in discrete steps (e.g. deleting two lines at a time, that is, deleting lines containing active video information and/or deleting equivalent lines from the vertical blanking interval) to a selected minimum value (e.g. down to 515 lines), such process being repeated in a generally cyclical manner. It is found that such deviations from the standard frame time base are sufficient to prevent satisfactory recording of the video signal by a video recorder but are not sufficient to prevent a video display device from displaying a video signal in a satisfactory manner which is acceptable to viewers. The gradual change in the number of lines tends to assure that the video display device will respond satisfactorily, i.e., it will provide a display which is substantially the same as an unaltered signal. Too drastic a change in the number of lines from one frame, or group of frames, to the next may tend to cause even the video display device to become unsatisfactory in its response, i.e., either the picture will lose synchronization entirely, it will jump in response to differing length frames, it will lose color, or it will geometrically distort.

While the particular scheme shown in FIG. 2 shows a symmetrical pattern of line changes over each cycle, such symmetry is not necessary. It would be acceptable, for example, to use non-symmetrical patterns for each cycle and to assure that over a longer time period (of many cycles) the number of lines added and the number of lines subtracted in the overall number of frames within such time period are essentially equal.

Alternatively, it would be possible to process the input video signal by adding a fixed number of lines to every frame and, when the total number of added lines in a group of sequential frames becomes substantially equal to that in a complete frame, to delete the entire next frame and begin the addition of lines again with a new sequential group of frames. In a similar manner it would be possible to process the input video signal by deleting a fixed number of lines from every frame and, when the total number of deleted lines in a group of sequential frames becomes substantially equal to that in a complete frame, to repeat the entire last frame and begin the deletion of lines again with a new sequential group of frames.

Figure 3:
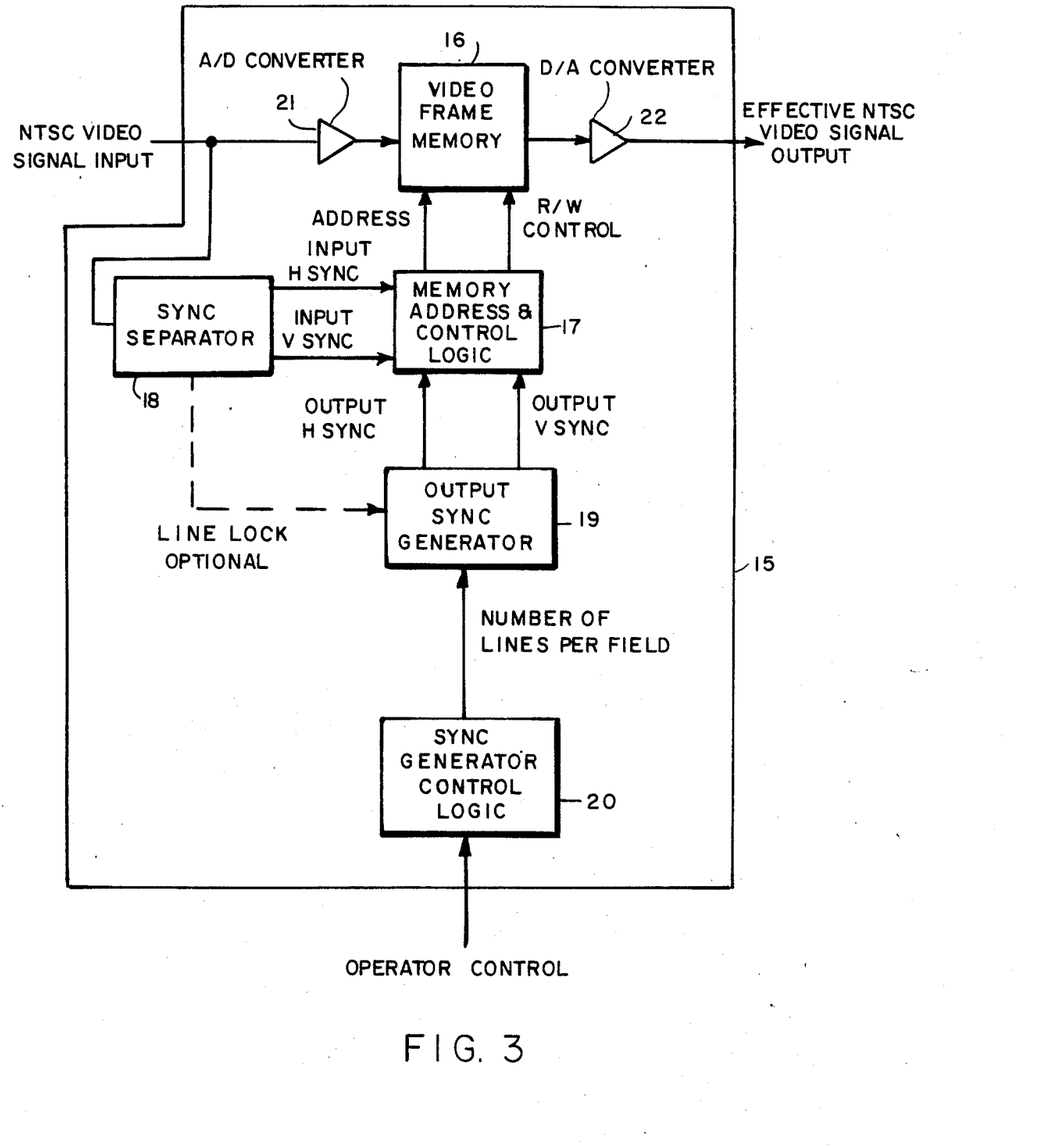
FIG. 3 shows a block diagram of a particular embodiment of the invention.

A specific embodiment of a processing scheme for providing an altered video signal for such purpose is shown in block diagrammatic form in FIG. 3. An incoming video signal, conforming to a selected standard, e.g., NTSC standard having 525 lines and 30 frames per second, is supplied as the input to a processing unit 15. The input video is supplied via an analog-to-digital converter 21 to a video frame memory unit 16 having appropriate memory address and control logic 17. The incoming signal is also supplied to synchronizing separator circuit 18 which separates out the input horizontal and vertical synchronizing signals (H SYNC and V SYNC) which are used to generate the memory address 16 during the write mode to store the lines of each incoming frame of the video signal input as is well known to the art. A stored frame of video information can then be subsequently read out from memory 16 utilizing output synchronizing-generator 19 and synchronizing generator control logic 20, as discussed in more detail below. During read-out, the time base for successively read-out frames can be altered by synchronizing generator 19 and control logic 20 so that for one or a group of selected frames one or more lines thereof (containing no real video information) are added to the original 525 lines thereof to provide a lengthened frame time and for one or a group of other selected frames one or more lines (containing video information) are deleted from the original 525 lines thereof to provide a shortened frame time. The frame time (i.e., corresponding to the total line count of a frame) and the rate of change of such line count from one frame, or group of frames, to the next can be controlled as described in more detail below.

The synchronizing generator 19 provides suitable output horizontal and vertical synchronizing signals to the memory address and control logic 17 during the read mode for reading out previously stored video frames, and either adding lines thereto or subtracting lines therefrom, depending on the line count for that particular frame as determined by control circuit 20, to produce altered video frames which are successively provided as the video output signal via digital-to-analog converter 22. Each output frame has a specified length which can vary, as discussed above, but which must still effectively conform to the same standard as the input video signal.

Figure 4:
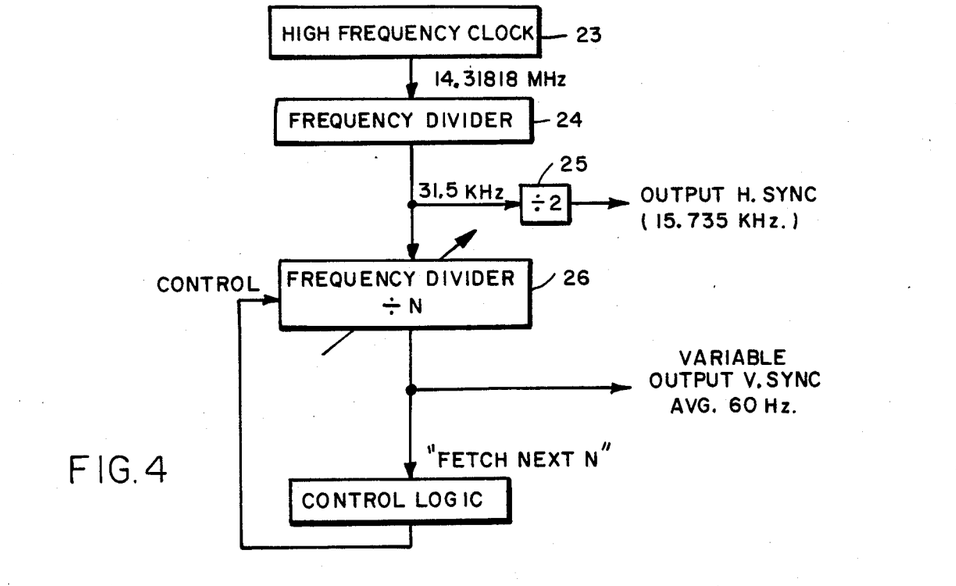
FIG. 4 shows a block diagram in more detail of a portion of the embodiment depicted in FIG. 3.

The synchronizing generator 19 and control logic 20 is shown in more detail in FIG. 4. A high frequency clock 23 provides a clock signal at 14.31818 MHz. (e.g., four times the color burst frequency) to a frequency divider 24 to produce a 31.5 KHz clock signal which is further divided by two in another frequency divider 25 to supply an NTSC standard horizontal synchronizing signal (output H SYNC) at 15.735 KHz. The 31.5 KHz signal is also supplied to a further variable frequency divider 26 which divides the frequency by a controllably variable factor N, where N is controlled by control logic 20. The output of frequency divider 26 is used as the variable rate output vertical synchronizing signal (output V SYNC) which for an NTSC standard system will have an average frequency of about 60 Hz.

Figure 5:
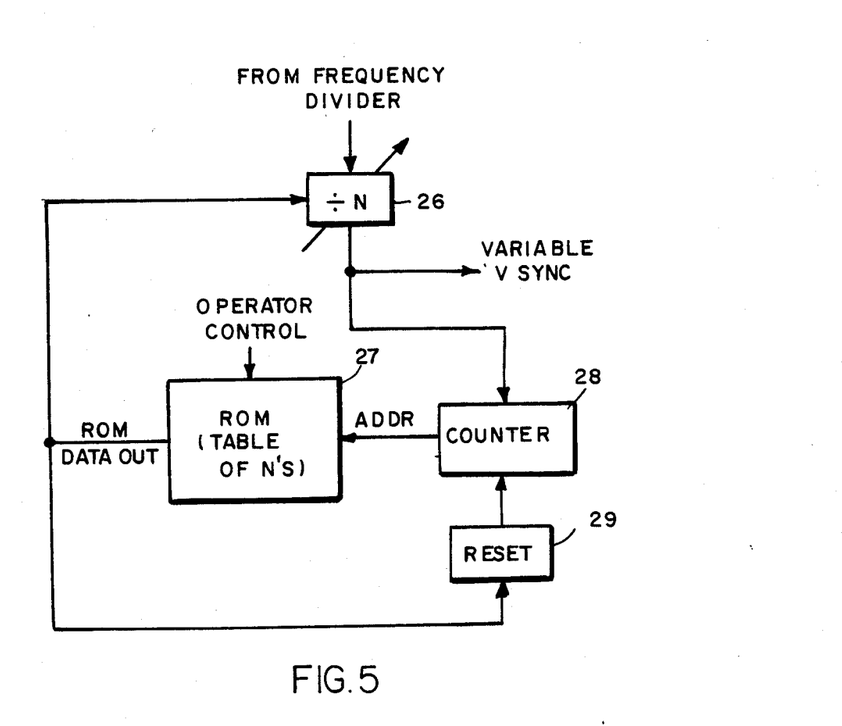
FIG. 5 shows a block diagram in more detail of a portion of the embodiment depicted in FIG. 4.

Control logic 20 provides the necessary control signal for controlling the value of N and is shown in more detail in FIG. 5. The output control signal is obtained from a suitable read only-memory (ROM) 27 which is addressed from a counter 28. Counter 28 supplies successive output address counts for addressing successive locations in ROM 27 thereby producing previously stored output control signals which control the operation of frequency divider 26 as would be well known to the art (in effect the ROM can be considered as providing a table of N's). The counter is reset at an appropriate time by a reset circuit 29 in response to a reset code supplied from an appropriately addressed location in ROM 27 at the end of a count cycle in order to reset counter 28 to begin its count again. A particular example of the operation thereof can be explained as follows showing the ROM Address associated with a selected number of lines for providing the variable V SYNC signal:

| ROM ADDRESS | V SYNC (Hz) | NUMBER OF LINES |
| --- | --- | --- |
| 0 | 59.10 | 533 |
| 1 | 59.32 | 531 |

-continued

| ROM ADDRESS | V SYNC (Hz) | NUMBER OF LINES |
|---|---|---|
| 2 | 59.55 | 529 |
| 3 | 59.77 | 527 |
| 4 | 60.00 | 525 |
| 5 | 60.23 | 523 |
| 6 | 60.46 | 521 |
| 7 | 60.69 | 519 |
| 8 | 60.93 | 517 |
| 9 | 60.69 | 519 |
| 10 | 60.46 | 521 |
| 11 | 60.23 | 523 |
| 12 | 60.00 | 525 |
| 13 | 59.77 | 527 |
| 14 | 59.55 | 529 |
| 15 | 59.32 | 531 |
| 16 | 59.10 | 533 |
| 17 | RESET CODE | — |

The counter counts through 16 address locations to produce appropriate control signals for frequency divider 26 so as to change the divisor number N, e.g. at the end of a group of frames, the number of frames in each group being selectable, to produce an output V SYNC signal which varies in discrete steps corresponding to varying line outputs as shown in the chart above (see also FIG. 2). When the cycle is completed the counter is reset to provide the same addressed locations again for the next cycle, and so on. Other combinations of control signals might also be stored in ROM 27 to be utilized as modifications of the scheme discussed above in order to achieve a particular desired variation in the time base of the video signal.

Figure 6:
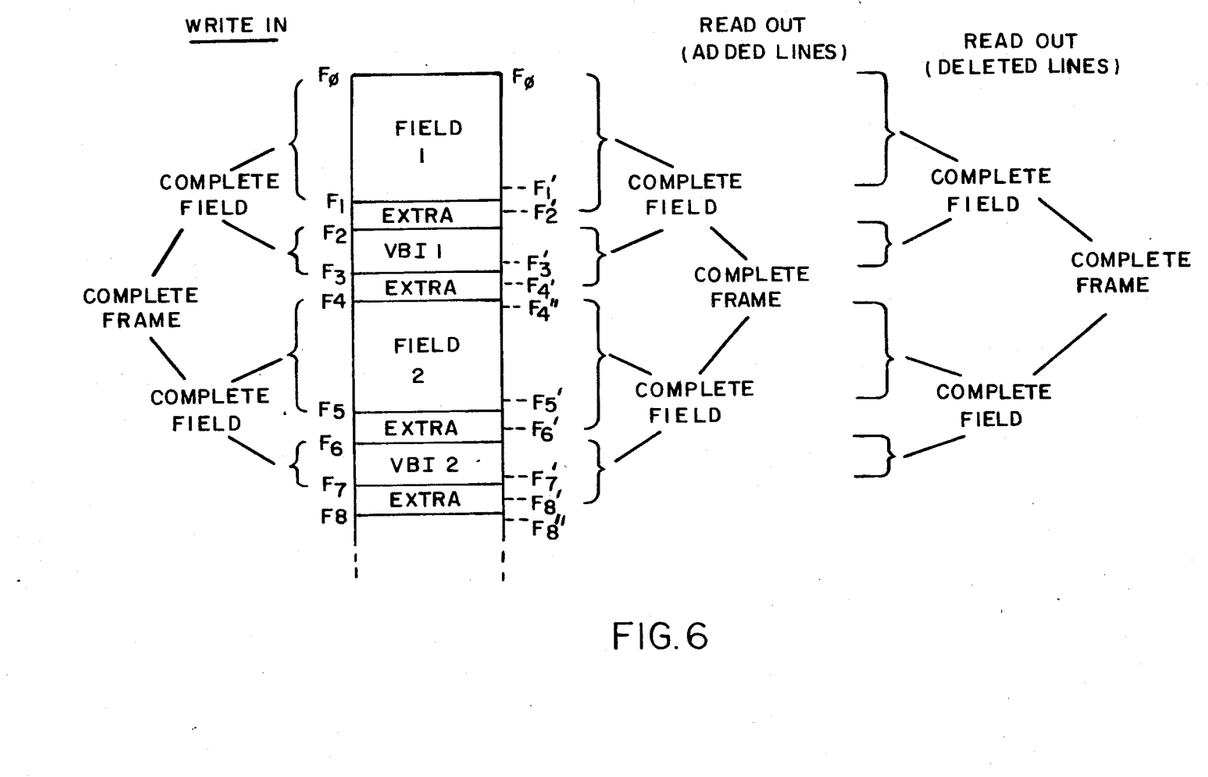
FIG. 6 shows a diagrammatic view of a technique for storing video information in the video memory of the embodiment depicted in FIG. 3.
Figure 7:
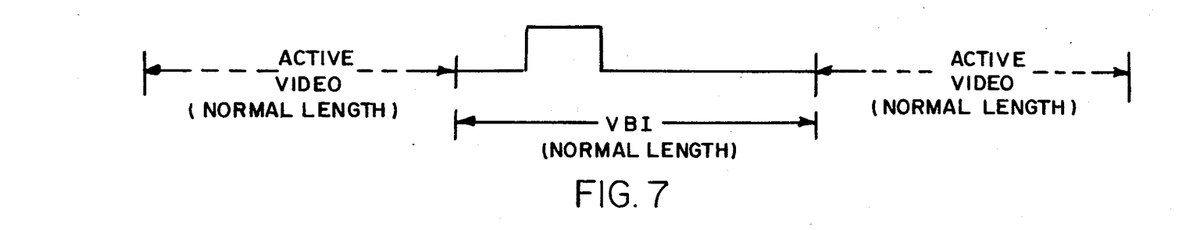
FIGS. 7, 7A and 7B show the handling of the vertical blanking interval and the active video information for various vertical time base alterations in accordance with the technique of the invention.
Figure 7A:
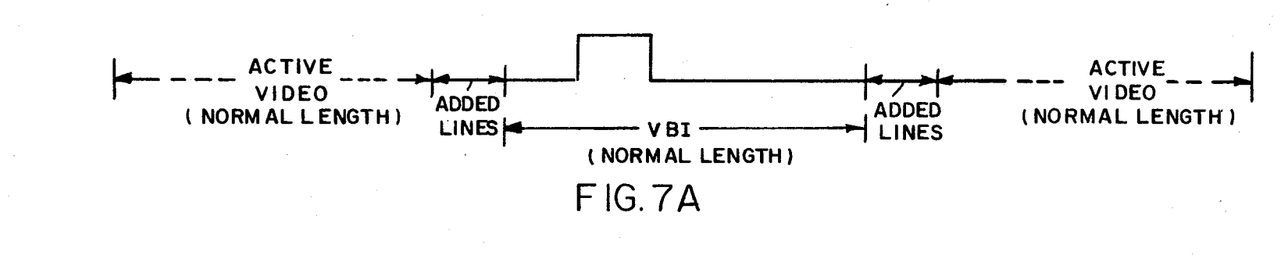

FIG. 6 shows how the video memory 16 might be configured in a typical embodiment thereof to provide for the storage and retrieval of a typical frame of video information. As can be seen therein, during the write mode the lines of the first field (FIELD 1) of the frame is stored at locations $F_0$ through $F_1$, the vertical blanking interval (VBI 1) is stored from $F_2$ to $F_3$, the lines of the second field (FIELD 2) of the frame is stored from $F_4$ through $F_5$ and the next vertical blanking interval (VBI 2) is stored from $F_6$ through $F_7$ to form the complete frame. The overall frame time base for storing the entire field is the time required to write the video input information into FIELD 1, VBI 1, FIELD 2, AND VBI 2. The memory is further arranged to store blank lines, e.g. lines containing no active video information, from $F_1$ to $F_2$, from $F_3$ to $F_4$, from $F_5$ to $F_6$ and from $F_7$ to $F_8$ on eash side of the vertical blanking intervals During the read-out mode, the overall frame time can be lengthened or shortened. For example, to lengthen the overall frame time during read-out, the active video data of Field 1 is read from $F_0$ to $F_1$, additional blank lines are read from $F_1$ to $F_2'$, the vertical blanking interval is read from $F_2$ to $F_3$, additional blank lines are read from $F_4'$ to $F_4$, the video data of Field 2 is read from $F_4$ to $F_5$, additional blank lines are read from $F_5$ to $F_6'$, the vertical blanking interval is read from $F_6$ to $F_7$ and additional blank lines are read from $F_8'$ to $F_8$. Such read-out is equivalent to adding a selected number of lines to the overall frame before and after each vertical blanking interval as shown in FIG. 7A.

Figure 7B:
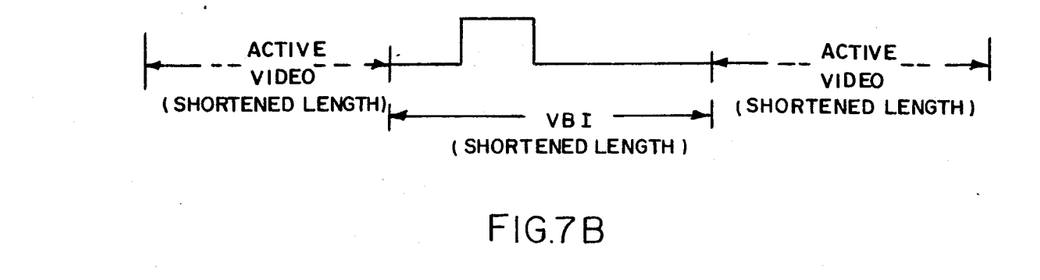

To shorten the overall frame time during the read-out mode, both active video lines and/or the vertical blanking interval can be shortened. Thus, a shortened Field 1 can be read from $F_0$ to $F_1'$, a shortened VBI 1 can be read from $F_2$ to $F_3'$, a shortened Field 2 can be read from $F_4''$ to $F_5'$, and a shortened VBI can be read from $F_6$ to $F_7'$. Such read-out is equivalent to deleting a selected number of lines from the active video information on either side of the vertical blanking interval as well as deleting a selected equivalent number of lines at one end of the vertical blanking interval, as shown in FIG. 7B. FIGS. 7A and 7B can be contrasted with a read-out of a frame in which the frame time base has not been altered, as shown in FIG. 7 wherein no lines have been added or deleted from the active video information or the vertical blanking interval.

The video memory unit 16, shown diagrammatically in FIGS. 3 and 6 represents, for example, a high speed memory which can be written into and read from effectively simultaneously. For example, a first previously stored frame is effectively read out from a first location while a second (next successive) frame is effectively simultaneously written in at a second different memory location (in fact access for successive read and write cycles is sequential, but such operations occur at a sufficiently high rate that they can be considered as effectively simultaneous). A third (next successive) frame is then written into the first location while the second previously stored frame is effectively read out from the second location, and so on.

Figure 8:
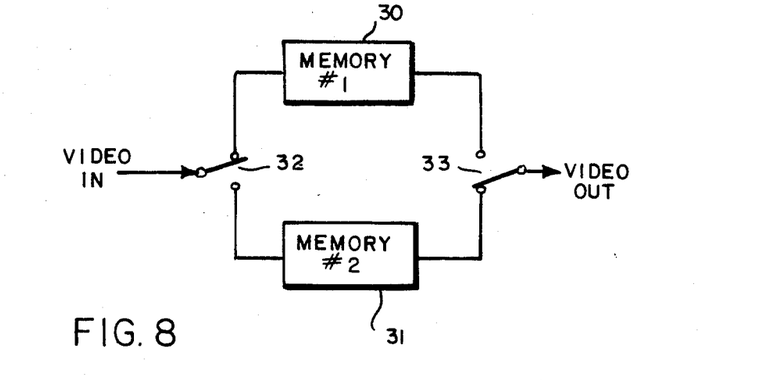
FIG. 8 shows a block diagram of an alternative dual memory configuration usable in the embodiment of the invention depicted in FIG. 3.

Alternatively, a slower dual memory as shown in FIG. 8 can be used having a first memory 30 and a second memory 31 with appropriate electronic logical switching circuitry, shown diagrammatically only as switch elements 32 and 33 so that a frame can be written into one memory while a previously stored frame is read out from the other memory, and vice-versa, to achieve the same operation as the high-speed memory discussed above but at a slower speed of operation.

While the above description discloses particular embodiments of the techniques of the invention, modifications thereto will occur to those skilled in the art within the spirit and scope of the invention. Hence, this invention is not to be construed as limited to the particular embodiments described herein except as defined by the appended claims.

What is claimed is:

1. A system for processing video signals comprising
    means responsive to an input video signal having charactristics conforming to a selected standard for storing succesive frames thereof;
    means for successively retrieving said stored video fames of said input video signal, said retrieving mean including
        means for selectively altering the time bases of selected ones of said successively retrieved video frames to provide an output video signal effectively conforming to the same selected standard, the selected ones of said successive video frames thereof having said altered times bases, said altering means comprising synchronizing circuit means for controlling said time bases in a selected manner.

2. A system in accordance with claim 1 wherein the time bases of selected ones of the video frames of said output altered video signal are lengthened.

3. A system in accordance with claim 1 wherein the time bases of selected ones of the video frames of said output altered video signal are shortened.

4. A system in accordance with claim 1 wherein said output altered video signal includes video frames the time bases of which are lengthened and video frames the time bases of which are shortened.

5. A system in accordance with claim 4 wherein the video frames of said altered output video signal are cyclically altered so that during each cycle a first plurality of successive video frames have lengthened time bases and a second plurality of successive video frames have shortened time bases.

6. A system in accordance with claim 5 wherein said first plurality of successive video frames are progressively lengthened by discrete time periods and wherein said second plurality of successive video frames are progressively shortened by discrete time periods.

7. A system in accordance with claim 2 wherein the altered video frames of said output altered video signal are lengthened by adding lines to said video frames.

8. A system in accordance with claim 3 wherein the altered video frames of said output altered video signal are shortened by deleting lines from said video frames.

9. A system in accordance with claim 4 wherein said lengthened frame time bases are altered by adding lines to said video frames and said shortened frame time bases are altered by deleting lines for said video frames.

10. A system in accordance with claim 5 wherein said lengthened frame time bases are altered by adding lines to said video frames and said shortened frame time bases are altered by deleting lines from said video frames.

11. A system in accordance with claim 1 wherein said input video signal conforms to NTSC standards wherein each video frame has a frame time base of about 1/30 of a second and a frame length of 525 lines and wherein said output altered video signal also effectively conforms to said NTSC standards and includes video frames having frame time bases and frame lengths which differ from said frame time base of about 1/30 second and said frame length of 525 lines.

12. A system in accordance with claim 11 wherein said output altered video signal includes video frames the frame time bases of which are greater than 1/30 of a second and video frames the frame time bases of which are less than 1/30 of a second.

13. A system in accordance with claim 11 wherein said output altered video signal includes a first plurality of video frames having more than 525 lines and a second plurality of video frames having less than 525 lines.

14. A system in accordance with claim 13 wherein said first plurality of video frames includes groups of frames which are successively lengthened by two lines up to a selected maximum number of lines greater than 525 lines, and wherein said second plurality of video frames includes groups of frames which are successively shortened by two lines down to a selected minimum number of lines less than 525 lines.

15. A system in accordance with claim 14 wherein said maximum number of lines is 533 lines and the said minimum number of lines is 517 lines.

16. A system in accordance with claim 1 wherein said storing means is a memory means capable of storing successive video frames and reading out successive video frames effectively simultaneously.

17. A system in accordance with claim 16 wherein said memory means includes a pair of memory means, each capable of storing video frames and reading out said stored frames,
input means responsive to said input video signal for supplying successive video frames thereof for storage alternately in each of said memory means, and
output means for supplying successive altered video frames read out alternately from each of said pair of memory means to provide said output altered video signal, said pair of memory means being arranged so that one of said memory means stores a video frame while the other reads out a previously stored video frame.

18. A system in accordance with claim 1 wherein said synchronizing circuit means includes
a synchronizing generator means for providing at least one variable control signal for selectively altering the time bases of said retrieved video frames; and
synchronizing control means for controlling the operation of said synchronizing generator means in accordance with a selected control scheme.

19. A system in accordance with claim 18 wherein said synchronizing generator means provides a variable vertical synchronizing signal for said output video signal.

20. A system in accordance with claim 19 wherein said synchronizing generator means includes
means for producing a clock signal having a fixed clock rate,
a frequency divider means responsive to said clock signal for dividing the clock rate of said clock signal by a variable value to produce said variable vertical synchronizing signal having a variable clock rate, and
means for controlling said variable value.

21. A system in accordance with claim 1 and further including
means for transmitting said output altered video signal for reception at a remote video signal receiver means used for displaying said altered video signal, the manner of alteration of the video frames thereof being selected to permit satisfactory display of the output altered video signal by said receiver means but to prevent said output altered video signal from being satisfactorily recorded by a video recording device.

* * * * *